UNITED STATES PATENT OFFICE.

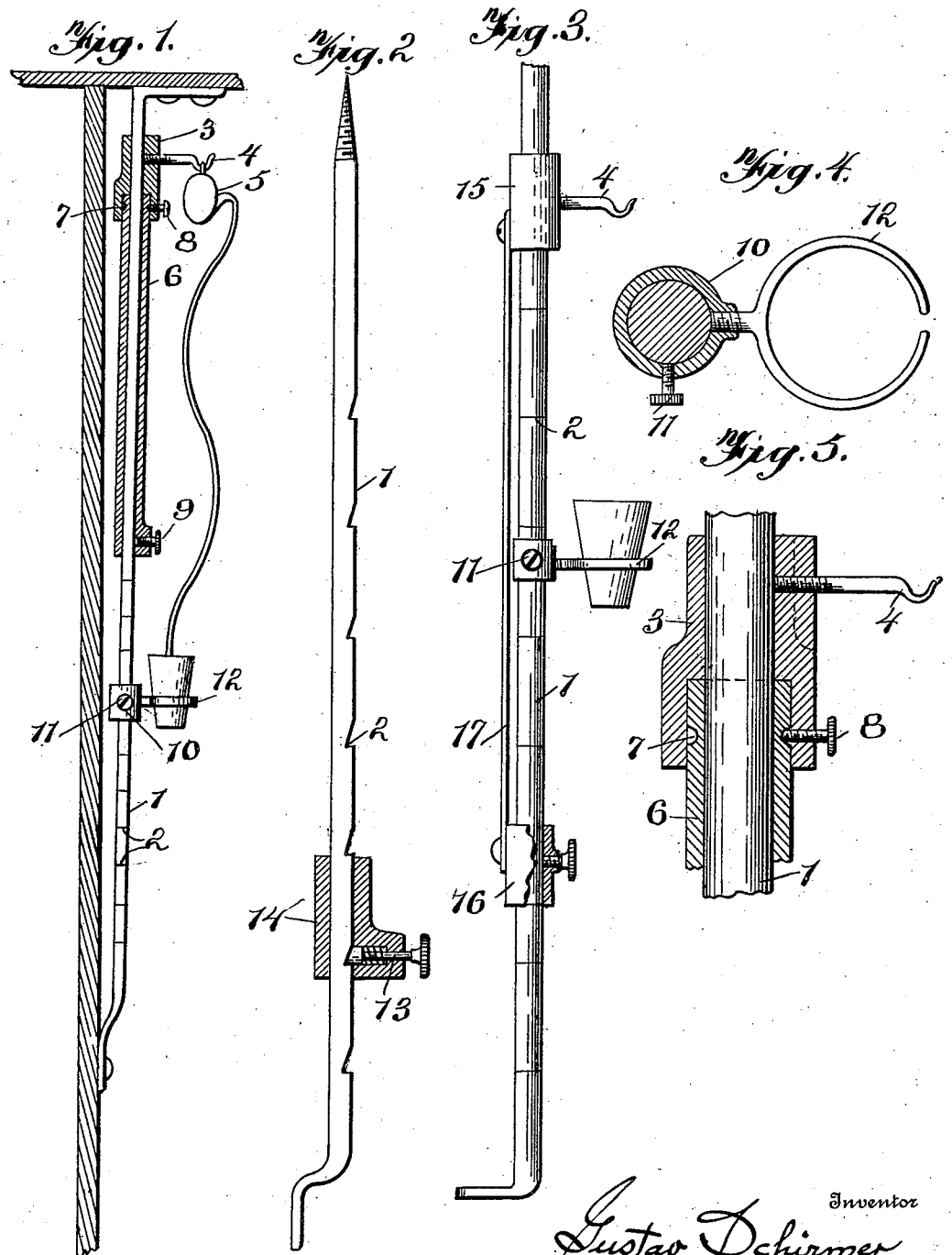

GUSTAV SCHIRMER, OF CHICAGO, ILLINOIS.

FOUNTAIN-SYRINGE HOLDER.

SPECIFICATION forming part of Letters Patent No. 692,920, dated February 11, 1902.

Application filed June 12, 1901. Serial No. 64,315. (No model.)

*To all whom it may concern:*

Be it known that I, GUSTAV SCHIRMER, a citizen of the United States, residing at Chicago, in the county of Cook and State of Illinois, have invented certain new and useful Improvements in Fountain-Syringe Holders; and I do declare the following to be a full, clear, and exact description of the invention, such as will enable others skilled in the art to which it appertains to make and use the same, reference being had to the accompanying drawings, which form a part of this specification.

My invention has relation to fountain-syringe holders; and it consists in the novel construction and arrangement of its parts, as hereinafter described.

The object of my invention is to provide a syringe-holder adapted to be mounted on the wall either in a physician's office, bath-room, or other places, the holder being so constructed and arranged that the reservoir fountain-syringe may be elevated to a high point or lowered from the same without unnecessary reaching and stretching of the operator. The holder is also provided with a series of graduations, whereby certain pressure or fall of water from the fountain-syringe may be attained. The holder is also provided with a perpendicularly-movable support for a glass tumbler or other vessel.

In the accompanying drawings, Figure 1 is a side elevation, partly in section, of the holder attached to the wall and ceiling and supporting a fountain-syringe. Fig. 2 is a side elevation of another form of a perpendicular rod having its graduations in the form of notches. Fig. 3 is a side elevation of still another form of the holder. Fig. 4 is a top plan view of the glass-tumbler support. Fig. 5 is a detailed sectional view of the upper collar and tube surrounding the perpendicular rod in the form of the invention as shown in Fig. 1.

The holder consists of the perpendicular rod 1, which is secured at its lower end to the side wall and at its upper end to the ceiling of the room. Said rod is provided with a number of graduations 2. In the form of the invention as shown in Fig. 1 the upper collar 3 is slidably mounted on said rod, said collar having a hook 4, from which the fountain-syringe 5 depends. The collar 3 has in its lower end an annular recess which receives the upper end of the tube 6, said tube being provided near its upper end with an annular groove 7. The set-screw 8 passes laterally through one side of the collar 3, the inner end of the said set-screw entering said annular groove 7 in a manner as shown in Fig. 5. The lower end of the tube 6 is provided with a set-screw 9, the inner end of which is adapted to impinge the rod 1. In the form of the invention as shown in Fig. 1 the tumbler-support 10 is located on the rod 1 at a comparatively low point. This support is slidably mounted on said rod and by means of the set-screw 11 can be secured at any one of various elevations. The support consists of an interrupted ring 12, as shown in detail in Fig. 4, which is adapted to receive the tumbler or other vessel in the manner as shown in Figs. 1 and 3.

The operation of the device as shown in Fig. 1 is: The fountain-syringe 5, filled with water, is placed on the hook 4, and the operator by lifting the lower end of the tube 6 can elevate the reservoir of the syringe to the vicinity of the ceiling, if he so desires. When the bag is elevated sufficiently, the operator tightens the set-screw 9, and the bag is held at the desired elevation. Should it be the desire to permit collar 3 and the bag 5 to make partial revolutions about the rod 1 when in the elevated position, the set-screw 8 is tightened prior to elevation. If it is desired to make the collar 3 rigid with relation to the tube 6, the set-screw 8 is tightened. After the syringe-bag 5 is elevated to the proper point the tumbler-support 10 can be shifted along the rod 1 and secured at any desired point.

In the form of the invention as shown in Fig. 2 the upper end of the rod 1 is sharpened and is thus adapted to be driven into the ceiling, while the lower end may be secured by any suitable means to the side wall. In this form of invention the graduations 2 are in the form of notches, said notches having one horizontal wall and one inclined wall. The said notches are adapted to receive the beveled end of the spring-actuated pin 13, which is mounted in the collar 14. Said collar 14 may be at the lower end of the tube, similar to 6, or on the tumbler-support. It will be seen that said collar 14 and its connections can be pushed upward along the rod 1. The inner end of the pin 13 will engage any one of the notches 2. When it is desired to lower the collar 14, the pin 13 must be pulled out, so as to disengage the inner end thereof from the notches of the rod 1.

In the form of the invention as shown in Fig. 3 the upper collar 15 is connected to the lower collar 16 by means of a bar 17. The lower collar is provided with an ordinary set-screw and the upper collar with a syringe-supporting hook. The tumbler-support 10 is located on the rod 1 between the two collars. In this form of invention it will be observed that the tumbler-support 10 can be shifted to a much higher elevation than in the form of the invention shown in Fig. 1. At the same time the operator by grasping the lower collar can elevate the syringe-bag as high as he could by using the form of the device as shown in Fig. 1.

Having described my invention, what I claim as new, and desire to secure by Letters Patent, is—

1. A syringe-holder consisting of a rod suitably secured, a collar slidably mounted on said rod, said collar adapted to support a syringe, a connection depending from said collar at its lower end surrounding said rod and means located at the lower end of said connection for securing the same to the rod.

2. A syringe-holder consisting of a rod suitably secured, said rod being provided with graduations, a collar slidably mounted on said rod, said collar adapted to support a syringe, a connection depending from said collar at its lower end surrounding said rod, and means located at the lower end of said connection for securing the same to the rod.

3. A syringe-holder consisting of a rod suitably secured, a collar located on said rod and adapted to support the syringe, a lower collar located on the rod being provided with a means for securing the same to the rod, a bar connecting the said collars together and a vessel-support located on the said rod between the said collars.

In testimony whereof I affix my signature in presence of two witnesses.

GUSTAV SCHIRMER.

Witnesses:
J. J. SCHIMEK,
H. F. STECKER.